United States Patent [19]
Way

[11] Patent Number: 5,974,917
[45] Date of Patent: Nov. 2, 1999

[54] MIG WELDING GUN CONTACT TIP CHANGING TOOL

[76] Inventor: Michael A. Way, 2627 S. Bennett, Wichita, Kans. 67217

[21] Appl. No.: 08/976,028

[22] Filed: Nov. 21, 1997

[51] Int. Cl.[6] .................................................. B23B 13/00
[52] U.S. Cl. .................................. 81/124.1; 81/64; 81/54
[58] Field of Search .............................. 81/124.2, 124.1, 81/121.1, 124.3, 176.15

[56] References Cited

U.S. PATENT DOCUMENTS

| | | | |
|---|---|---|---|
| 2,607,620 | 8/1952 | Oliveri | 294/64 |
| 2,676,506 | 4/1954 | Schultz | 81/54 |
| 3,224,302 | 12/1965 | Cooley | 81/124.1 |
| 4,417,487 | 11/1983 | Stephens | 81/53.2 |

Primary Examiner—David A. Scherbel
Assistant Examiner—Sinclair Skinner
Attorney, Agent, or Firm—Kenneth Jack

[57] ABSTRACT

A tool for installing and removing MIG welding gun contact tips, the contact tips being substantially cylindrical, having substantially circular cross-sectional shapes and having cross-sectional diameters; the tool consisting of a tube having an outer peripheral surface, having a forward, having a rearward end, and having a conical bore, the conical bore of the tube having a forward end and a rearward end, the forward end of the conical bore having a diameter greater than the cross-sectional diameters of the contact tips and the rearward end of the conical bore having a diameter less than the cross-sectional diameters of the contact tips; and 'T' handle means fixedly attached to or homogeneously fused with the outer peripheral surface of the tube.

14 Claims, 7 Drawing Sheets

5,974,917

MIG WELDING GUN CONTACT TIP CHANGING TOOL

FIELD OF THE INVENTION

This invention relates to hand held tools for changing the contact tips of MIG welding guns without the requirement of nozzle removal.

BACKGROUND OF THE INVENTION

A typical MIG welding gun has a nozzle for directing a flow of inert gas such as argon over an area in which welding takes place. Such nozzles typically annularly surround an electrically conductive welding contact tip, and are typically attached to the MIG welding gun by means of an electrical insulating plastic sleeve. Where such a nozzle is removed from a MIG welding gun, threadedly mounted contact tips are easily removed through torsional application of pliers to the exterior surface of the contact tip, turning the contact tip in a counter-clockwise motion. In order to install such a contact tip, the contact tip is turned clockwise. Such contact tips typically are composed of a copper alloy and are cylindrical in shape, having a circular cross-section. Where pliers are used for installation or removal, a protective cloth may be utilized to prevent the jaws of the pliers from gouging the brass surfaces of the contact tip.

Through the long-term effects of heat and accumulation of weld spatter, MIG welding gun nozzles commonly become fused with their insulating sleeves which connect the nozzle to the gun. Where such fusion occurs, the nozzle is difficult to remove, and upon removal of a fused nozzle, the insulating sleeve commonly is damaged or destroyed. Without removal of such a nozzle, pliers cannot be utilized for removal and installation of the contact tip. Also, due to the typical circular cylindrical shape of the contact tips, a common socket wrench cannot be utilized for such installation and removal. MIG welding gun contact tips are necessarily changed whenever a differently gauged welding wire is used; and it is undesirable to remove the nozzle whenever the contact tip is changed. Thus, it is desireable to provide a tool capable of such contact tip removal and installation without the requirement of removal of the nozzle. The instant invention provides an economically constructed hand held tool which performs such function.

PRIOR ART PATENTS

U.S. Pat. No. 4,417,487 issued Nov. 29, 1983, to Stephens discloses a tool for cleaning or changing MIG contact tips.

U.S. Pat. No. 4,329,892 issued May 18, 1982, to Daigle discloses a socket wrench having an ejection rod.

U.S. Pat. No. 2,924,481 issued Feb. 9, 1960, to Wagstaff discloses a lamp extractor and injector having a lamp ejector shaft.

U.S. Pat. No. 2,641,229 issued Sep. 8, 1953, to Lenz discloses a wrench socket having a nut ejector.

U.S. Pat. No. 2,607,620 issued Aug. 19, 1952, to Oliveri discloses a gripping tool.

U.S. Pat. No. 2,470,399 issued May 17, 1949, to Holben discloses a socket wrench having a nut ejector.

U.S. Pat. No. 2,358,249 issued Sep. 12, 1942, to Portuondo discloses a wrench for turning slotted nuts.

U.S. Pat. No. 1,677,473 issued Jul. 17, 1928, to Gast discloses a combination socket wrench and screw driver.

U.S. Pat. No. 291,961 issued Jan. 15, 1884, to True discloses a carriage wrench having an ejector shaft.

None of the above disclosed patents teach or describe the novel, inventive and unique aspects, elements and features of the present invention.

BRIEF SUMMARY OF THE INVENTION

Contact tips of common MIG arc welding guns typically are cylindrical, having a circular cross-sectional shape and are composed of a copper alloy. Common sizes of contact tips have outside diameters of 0.25 inches, 0.281 inches, 0.313 inches, 0.344 inches, or 0.375 inches. Such contact tips commonly are threadedly mounted or cam lock mounted upon the forward end of a gas diffuser of a MIG welding gun, the gas diffuser and the contact tip being annularly shrouded by a gas directing nozzle.

Such gas directing nozzles tend to become fused with the welding gun making it difficult to utilize a tool such as pliers for removal and installation of the contact tip. The major structural element of the instant inventive tool is a steel tube, preferably 10/28 carbon steel DOM tubing, the tube having a conical bore at its forward end. In fabricating such a tool for installation and removal of, for example, a contact tip having a 0.313 inch outside diameter, the bore of the tube may be milled with a conical milling bit so that the inside diameter of the forward end of the tube is 0.325 inches in diameter, the bore sloping inwardly to an inside diameter of 3.01 inches at a rate of ¼ inch/foot. A punch press flaring tool may also be suitably utilized in fabricating the conical bore. Preferably, the outside diameter of the forward end of the tube allows for clearance beneath the inner peripheral surface of a gas directing nozzle surrounding the contact tip. When such a tube, having a milled conical bore, is driven forward by manual pressure over the exemplary contact tip having a 0.313 inch outside diameter, the forward end of the contact tip contacts the inner surface of the conical bore approximately midway between the conical bore's forward and rearward ends. Such manual pressure causes the forward end of the contact tip to temporarily obturate, resulting in intense localized pressure between the forward end of the contact tip and the inner wall of the conical bore. Such pressure is directed radially outward, resulting in intense friction between the forward end of the contact tip and the wall of the conical bore. Such frictional contact between the forward end of the contact tip and the wall of the conical bore allows the tube to be utilized as a wrench for turning the contact tip clockwise or counter-clockwise for installing or removing the contact tip from the MIG welding gun.

After such tool having such a conically bored forward end is utilized to remove a contact tip from a MIG welding gun, the tip remains lodged within the conical bore of the tool and is difficult to remove by simply manually pulling on the contact tip. The inventive tool provides a contact tip ejector rod, the rod being slidably mounted within the bore of the tube, the rearward end of the ejector rod extending rearwardly from the rearward end of the tube. In order to eject a contact tip from the conical bore of the tube, a welder may simply strike the rearward end of the ejector rod upon a hard surface such as a welding table, causing the forward end of the ejector rod to drive the contact tip out of the tool's conical bore. In order to assist in utilizing the tool for turning a contact tip, winged protrusions extending radially outward from the outer peripheral surface of the tube are provided. Alternately, the tool includes a screw driver type handle annularly surrounding the tube.

Accordingly, it is an object of the present invention to provide a MIG welding gun contact tip changing tool having a steel tube, the tube having a conical bore for grasping and turning a contact tip without the requirement of removal of a gas directing nozzle annularly enshrouding the contact tip.

It is a further object of the present invention to provide such a tool further providing a contact tip ejecting rod for dislodging contact tips lodged within the tool's conical bore.

It is a further object of the present invention to provide such a tool further providing manual turning means.

Other and further objects, benefits, and advantages of the present invention will become known to those skilled in the art upon review of the Detailed Descriptions which follow, and upon review of the appended drawings.

DETAILED DESCRIPTION OF THE PREFERRED EMBODIMENT

Figure 1:
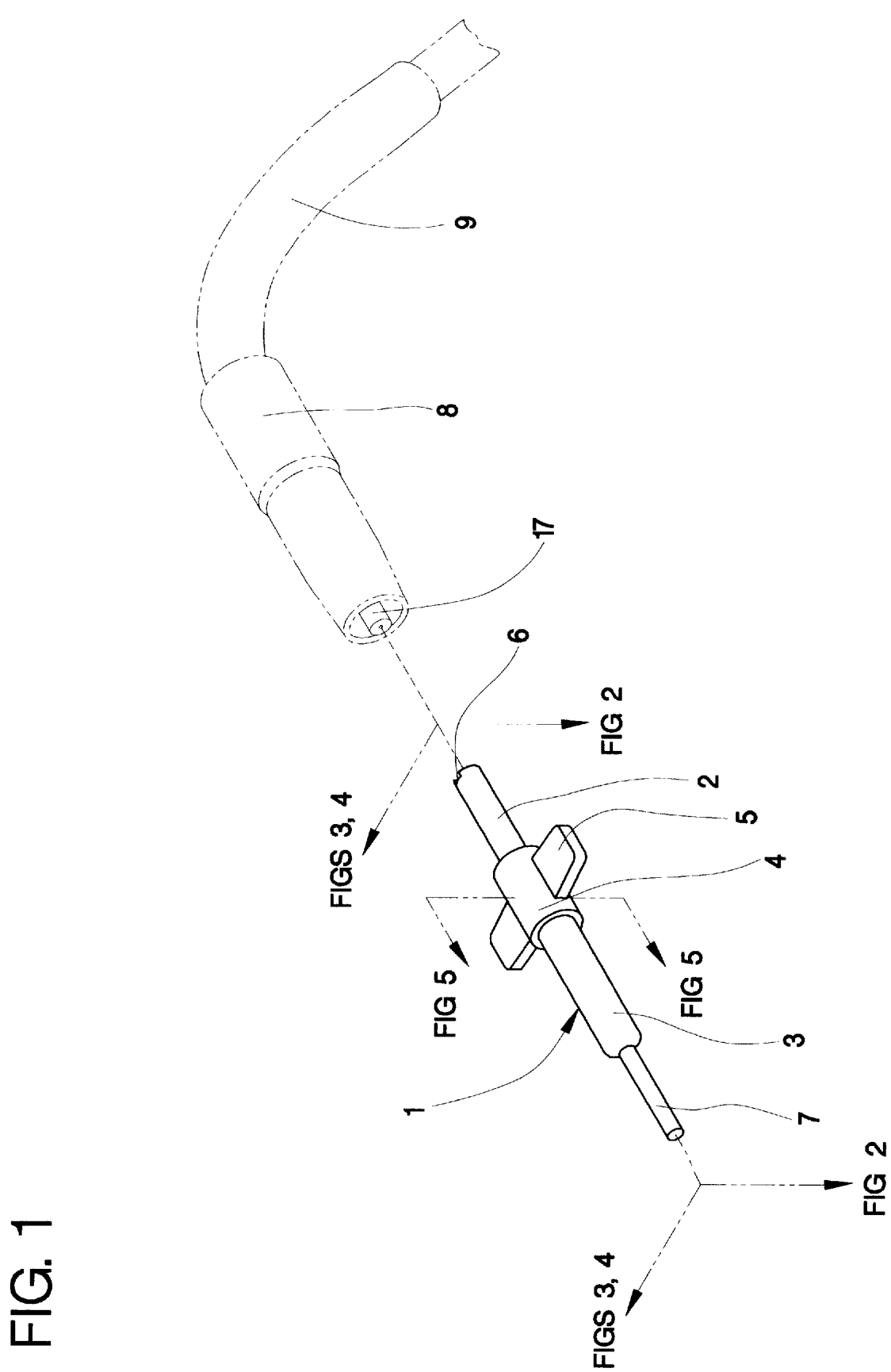
FIG. 1 is an isometric view of a preferred embodiment of the MIG welding gun contact tip changing tool.
Figure 2:
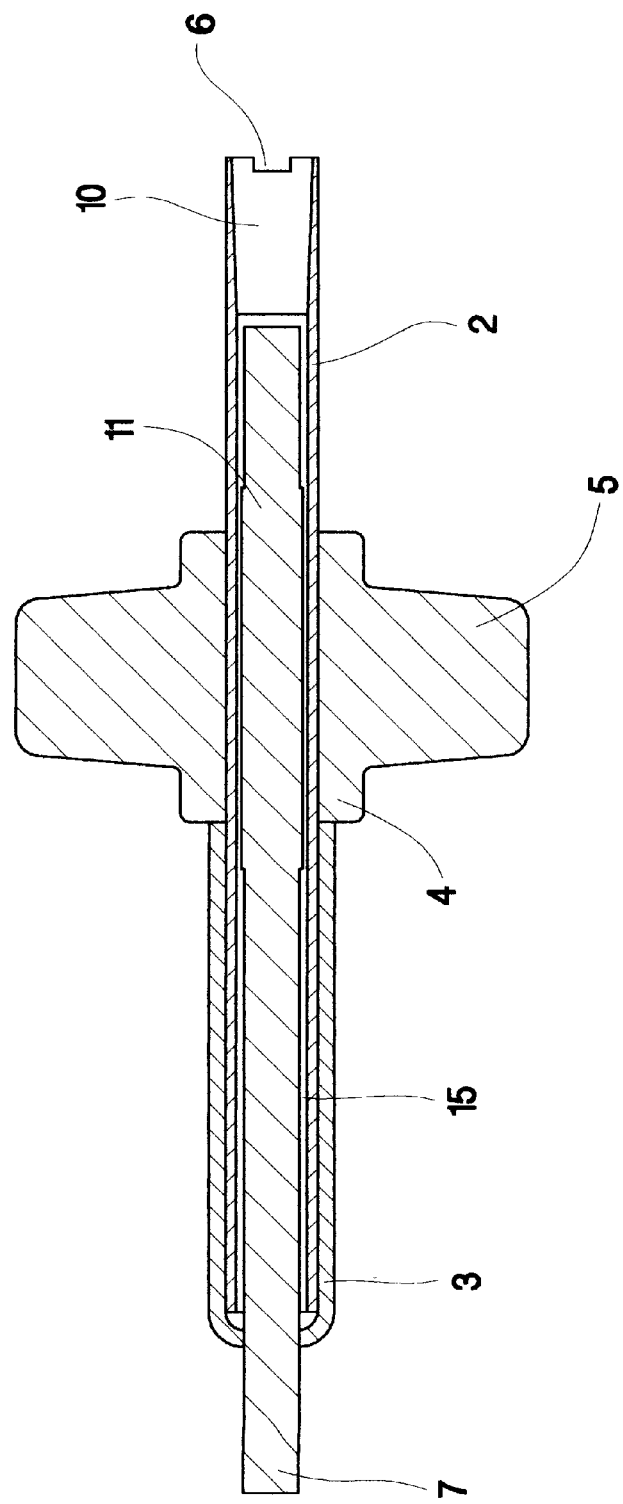
FIG. 2 is a longitudinal sectional view of said embodiment of the MIG welding gun contact tip changing tool.

Referring now to the drawings, and in particular to FIG. 1, the MIG welding gun contact tip changing tool is referred to generally by Drawing Element 1. The major structural element of the tool 1 is a hollow steel tube 2. Referring to FIG. 2, the hollow steel tube 2 has a hollow axial channel 15, the hollow axial channel 15 being contiguous with a hollow conical bore 10 at its forward end. Referring simultaneously to FIGS. 1 and 2, the forward end of the conical bore 10 is fitted for installation and removal of a MIG welding gun contact tip 17, such contact tip 17 typically having an outside diameter of 0.25 inches, 0.281 inches, 0.313 inches, 0.344 inches, or 0.375 inches. Such contact tips 17 typically are composed of a copper alloy for high electrical conductivity. Preferably, the outside diameter of the tube 2 is such that its outer peripheral surface may pass beneath the inner peripheral surface of the nozzle 8 of the welding gun 9. Preferably, the conical bore 10 has a forward inside diameter approximately 0.012 inches greater than the outside diameter of the contact tips to which the tool is to be applied. Also preferably, the conical bore slopes inwardly at a rate of approximately 0.25 inches per foot.

Referring further to FIGS. 1 and 2, upon manually thrusting the conical bore 10 of the tube 2 forwardly over the forward end of the contact tip 17, the forward end of the contact tip 17 temporarily obturates, resulting in enhanced frictional contact between the contact tip and the interior surface of the conical bore 10. Upon establishment of such frictional contact, manual torsional pressure may be applied to the wings 5 of the handle 4, turning such wings 5 in a counter-clockwise motion, turning the contact tip 17 counter-clockwise, causing the contact tip 17 to be removed from its threaded or cam lock mounting.

Figure 4:
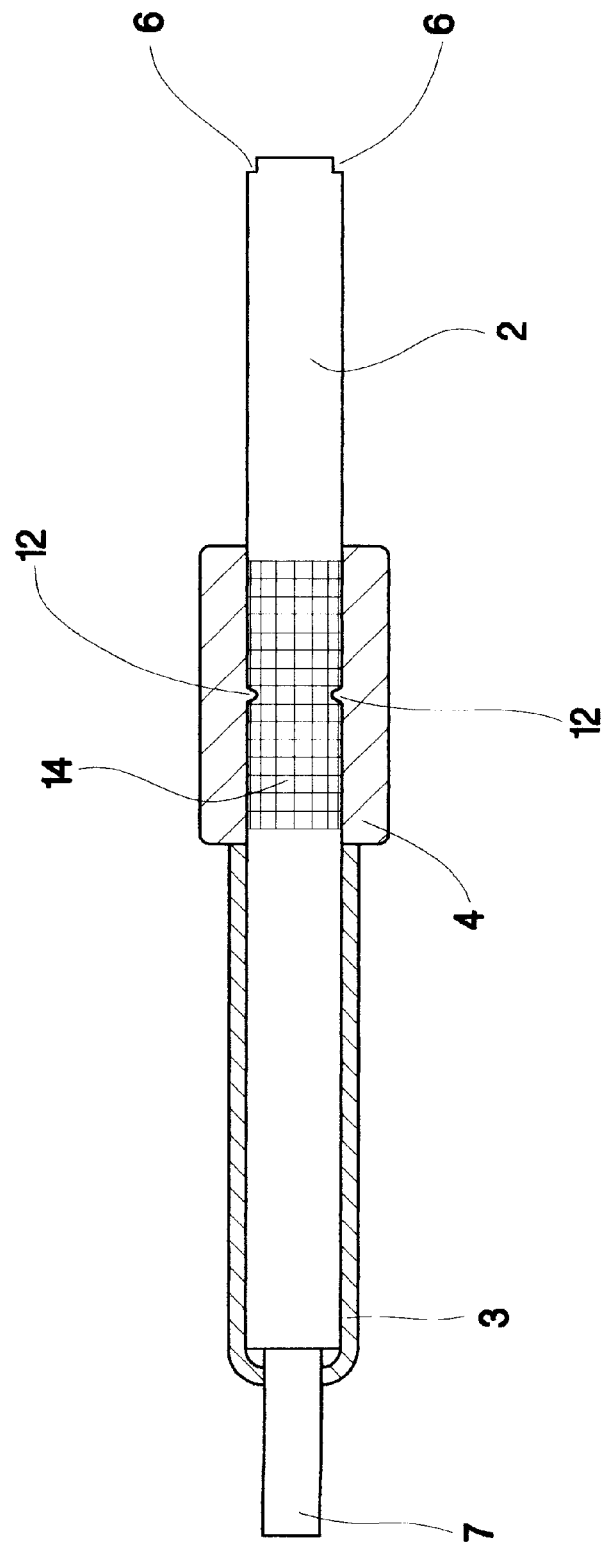
FIG. 4 is a third longitudinal sectional view of said embodiment of the MIG welding gun contact tip changing tool.
Figure 5:
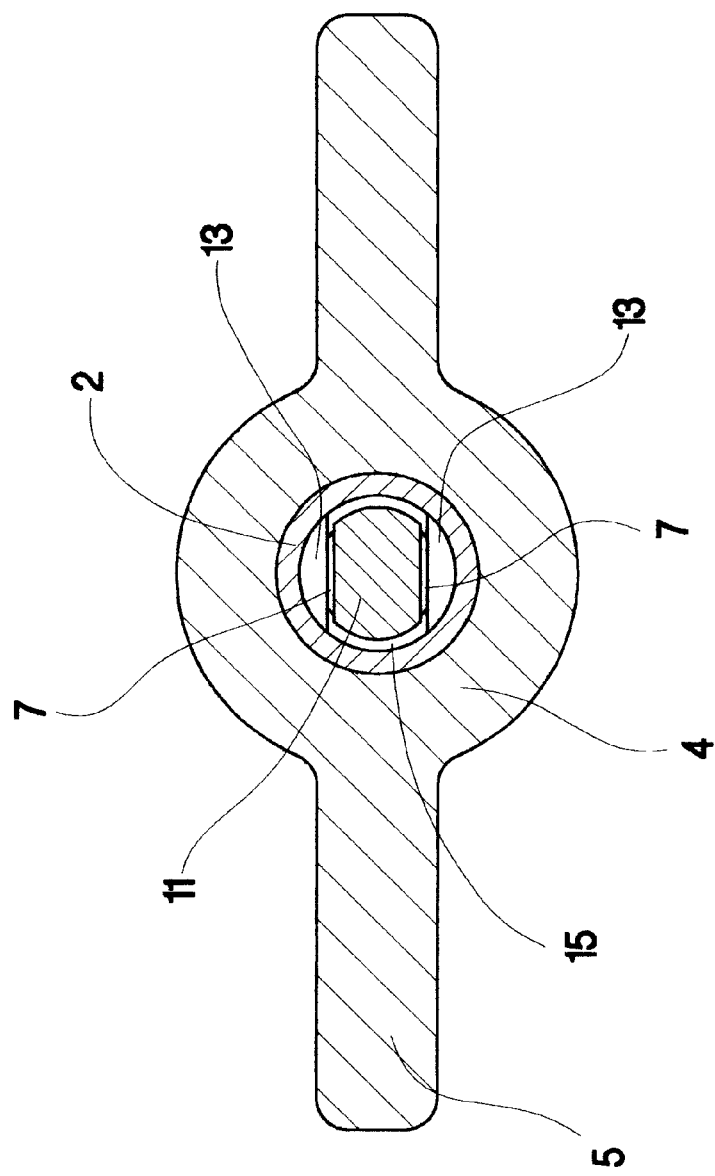
FIG. 5 is a lateral sectional view of said embodiment of the MIG welding gun contact tip changing tool,.
Figure 6:
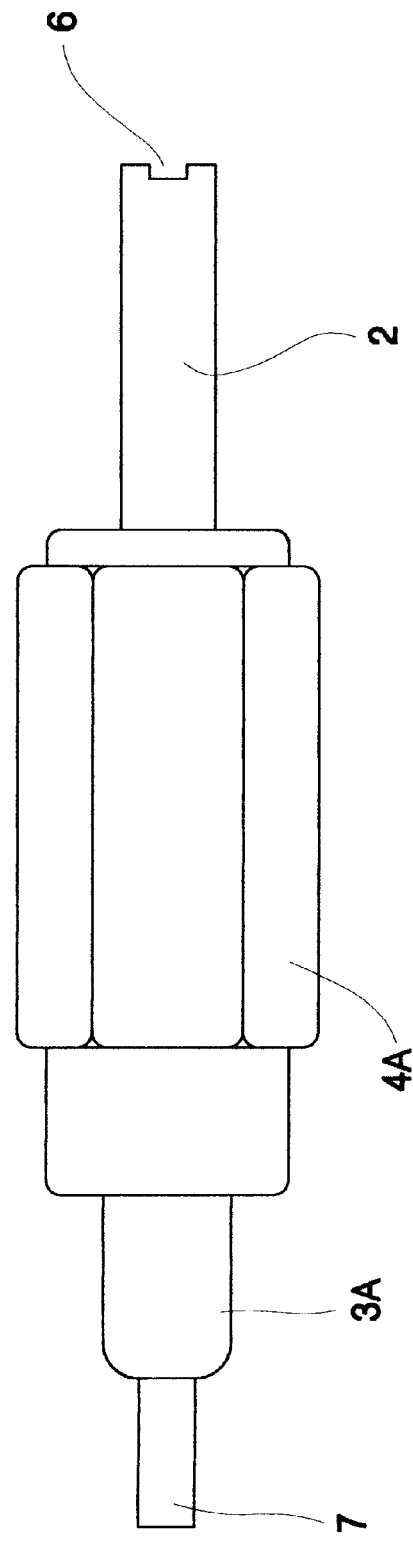
FIG. 6 is a side view of an alternate embodiment of the MIG welding gun contact tip changing tool.
Figure 7:
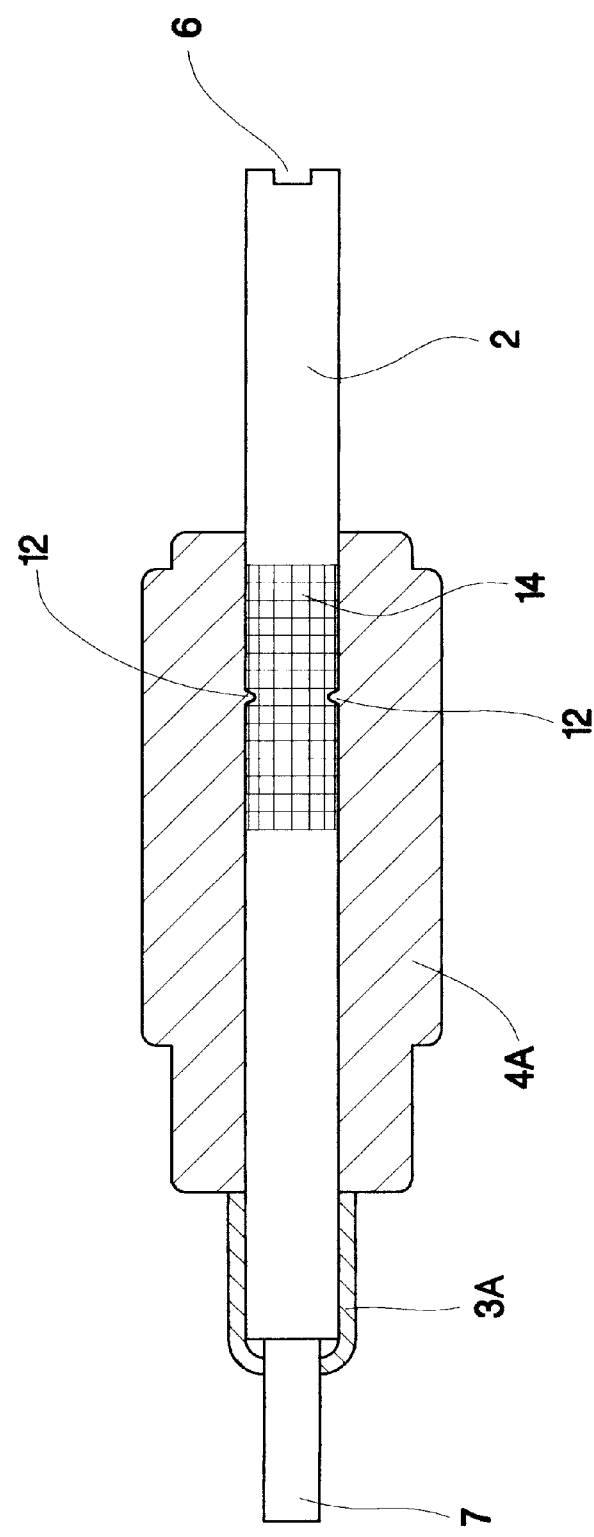
FIG. 7 is a longitudinal sectional view of said alternate embodiment of the MIG welding gun contact tip changing tool.

Preferably, the handle 4 is composed of a high strength plastic such as acetal, the handle 4 being fabricated over the tube 2 in an injection molding process. Referring to FIG. 4, the handle 4 preferably is located over indentations 12, the indentations 12 providing a rotation stop, preventing the handle 4 from rotating with respect to the tube 2. Also preferably, the tube 2 has a knurled surface 14 for additional resistance against such rotation. Referring simultaneously to FIGS. 6 and 7, a screw driver style handle 4A may be alternately utilized in place of, referring to FIG. 1, the handle 4 having wings 5. Utilization of the alternate screw driver type handle 4A allows additional torque to be manually applied to the tube 2.

Referring further to FIGS. 1 and 2, upon utilization of the tool 1 for removal of the contact tip 17 from the welding gun 9, the contact tip typically remains lodged within the conical bore 10. In order to conveniently remove the contact tip 17 from the conical bore 10, a welder simply grasps the tool 1 and strikes the rearward end of the tool 1 against a hard surface such as a welding bench. Such striking motion causes a welding tip ejecting rod 7 to be driven forwardly through the hollow axial channel 15 of the tube 2, causing the forward end of the tip ejecting rod 7 to come into pressurized contact with the contact tip 17, driving the contact tip forwardly out of the conical bore 10.

Referring to FIG. 1 in utilizing the tool 1 for installation of a contact tip 17 into the welding gun 9, the contact tip 17 is manually inserted into the forward end of the tube 2, and the tool 1 is utilized to forwardly press and rotate the contact tip 17, threadedly installing or cam lock mounting the contact tip into the welding gun 9. The tip ejecting rod 7 is not needed in order to dislodge the tool 1 from a newly installed contact tip 17, the tool 1 being removable by a simple pulling motion.

Figure 3:
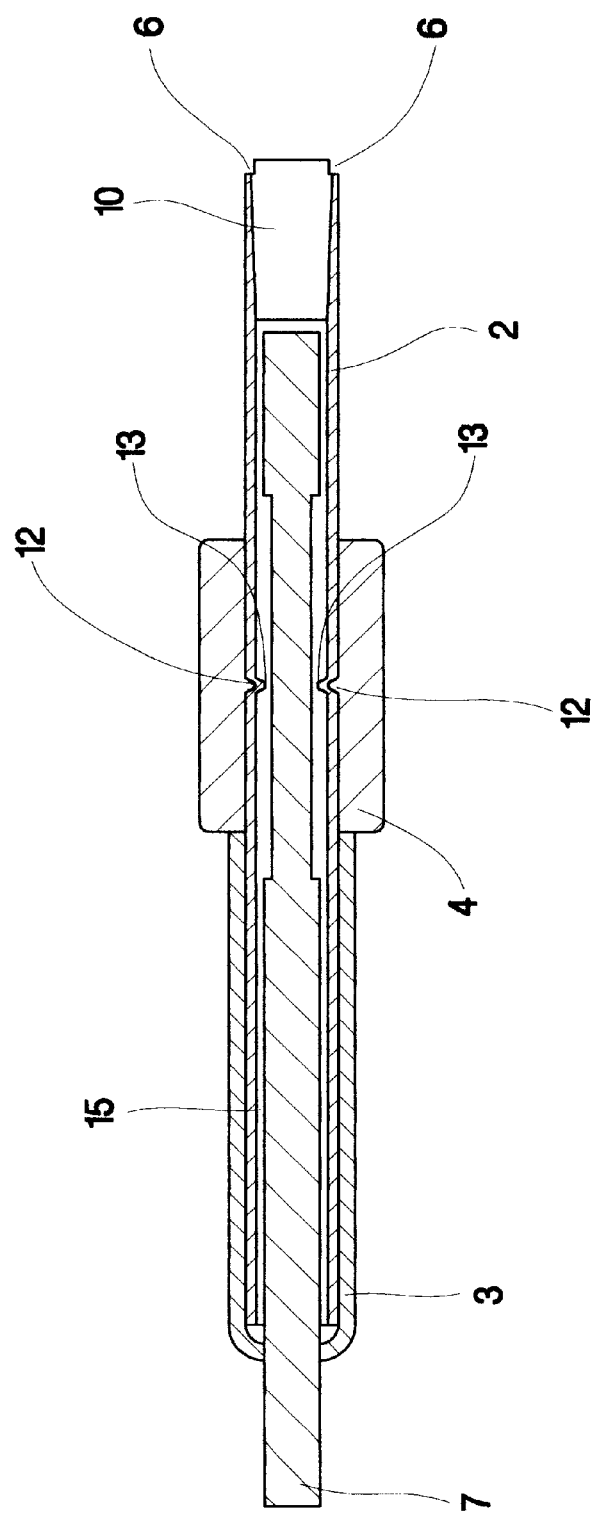
FIG. 3 is a second longitudinal sectional view of said embodiment of the MIG welding gun contact tip changing tool.

Referring simultaneously to FIGS. 2 and 3, the contact tip ejecting rod 7 has opposing flattened sections 11. The inwardly extending indentations 12 of the tube 2, in addition to functioning as rotation stops for the handle 4, form interior slide stops 13. The slide stops 13 alternately engage the forwardly facing and rearwardly facing walls of the flattened area 11, limiting the range of slidable motion of the tip ejection rod 7.

Referring simultaneously to FIGS. 1 and 2, the tool 1 preferably has a flexible plastic cap 3 mounted over the rearward end of the tube 2, the flexible cap 3 having a rearward aperture, such aperture being fitted for providing frictional contact with the exterior peripheral surface of the tip ejecting rod 7. The flexible cap 3 having a fitted rearward aperture prevents the tip ejecting rod 7 from freely sliding and rattling within the hollow axial channel 15 of the tube 2. Referring to FIG. 7, where the alternate screw driver type handle 4A is utilized, the flexible cap 3A is shortened.

Referring simultaneously to FIGS. 1, 2 and 3, the forward end of tube 2 preferably has a plurality of serrating notches 6. Commonly, the forward end of the contact tip 17 becomes encrusted with weld spatter. The serrating notches 6 allow the forward end of the tube 2 to be utilized to grind and cut away such weld spatter, allowing the forward end of the contact tip to be inserted into the conical bore 10.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A tool for installing and removing a MIG welding gun contact tip, the contact tip being substantially cylindrical, having a substantially circular cross-sectional shape and having a cross-sectional diameter; the tool comprising:

(a) a tube having an outer peripheral surface, having a forward end, having a rearward end, and having a conical bore, the conical bore of the tube being rigid and having a forward end and a rearward end, the forward end of the conical bore having a diameter greater than the cross-sectional diameter of the contact tip and the rearward end of the conical bore having a diameter less than the cross-sectional diameter of the contact tip; and, (b) turning means fixedly attached to or homogeneously fused with the tube.

2. The tool of claim no. 1, wherein the turning means comprises a manual turning means.

3. The tool of claim no. 2, further comprising a tip ejection rod having a forward end and a rearward end, the tip ejection rod being slidably mounted within the tube so that the tip ejection rod may slide from a first position wherein the rearward end of the tip ejection rod extends rearwardly from the rearward end of the tube, and wherein the forward end of the tip ejection rod is positioned rearward of the forward end of the tube, to a second position wherein the forward end of the tip ejection rod extends into the conical bore of the tube, the tip ejection rod, being capable, upon such sliding motion, of driving a contact tip forwardly out of the conical bore.

4. The tool of claim no. 3, further comprising a first plurality of slide stops fixedly attached to or homogeneously fused with the tube, and second plurality of slide stops fixedly attached to or homogeneously fused with the tip ejection rod, the first and second pluralities of slide stops being respectively positioned upon the tube and upon the tip ejection rod so that they may restrict sliding motion of the tip ejection rod within the tube to positions between and including said first and second positions.

5. The tool of claim no. 4, wherein the first plurality of slide stops comprise first inwardly extending indentations, the first inwardly extending indentations having first forwardly facing and first rearwardly facing slide stopping walls.

6. The tool of claim no. 5, wherein the second plurality of slide stops comprise second inwardly extending indentations, the second inwardly extending indentations having second forwardly facing and second rearwardly facing slide stopping walls.

7. The tool of claim no. 6, wherein the manual turning means comprises knurling of the outer peripheral surface of the tube.

8. The tool of claim no. 6, wherein the manual turning means comprises a handle having an axial channel therethrough, the axial channel being fitted for receiving and fixedly retaining the outer peripheral surface of the tube.

9. The tool of claim no. 8, further comprising a plurality of wings fixedly attached to or homogeneously fused with the handle.

10. The tool of claim no. 9, wherein the forward end of the tube is serrated.

11. The tool of claim no. 10, further comprising a flexible cap mounted over the rearward end of the tube, the flexible cap having a rod receiving aperture therethrough, the rod receiving aperture having an inwardly facing wall, the rod receiving aperture being fitted and positioned so that its inwardly facing wall is in frictional contact with the tip ejecting rod.

12. The tool of claim no. 11, wherein the tube comprises steel.

13. The tool of claim no. 12, wherein the flexible cap comprises nylon.

14. The tool of claim no. 13, wherein the handle comprises injection molded plastic.

\* \* \* \* \*